United States Patent
Maier et al.

(10) Patent No.: US 6,463,127 B1
(45) Date of Patent: Oct. 8, 2002

(54) METHOD AND APPARATUS FOR SPEAKER VERIFICATION AND MINIMAL SUPERVISORY REPORTING

(75) Inventors: Edward Frank Maier, Naperville; Nancy Olds Hendrix, Woodridge; Terese Brand, Burr Ridge, all of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/541,235

(22) Filed: Apr. 3, 2000

Related U.S. Application Data

(63) Continuation of application No. 09/119,409, filed on Jul. 20, 1998.

(51) Int. Cl.[7] .............................................. H04M 11/04
(52) U.S. Cl. .............................. 379/38; 379/39; 379/45
(58) Field of Search ............................... 379/38, 88.01, 379/88.02, 45, 46, 39, 40, 42, 43, 44, 49, 50; 340/573, 505

(56) References Cited

U.S. PATENT DOCUMENTS

| | | | |
|---|---|---|---|
| 4,843,377 A | * | 6/1989 | Fuller et al. .................. 379/38 |
| 4,952,928 A | | 8/1990 | Carroll et al. |

(List continued on next page.)

FOREIGN PATENT DOCUMENTS

| | | |
|---|---|---|
| EP | 0 344 138 | 11/1989 |
| EP | 0 357 309 | 3/1990 |
| EP | 0 212 947 | 11/1992 |
| EP | 0661690 | 7/1995 |
| EP | 2 314 436 | 12/1997 |
| EP | 2 320 644 | 6/1998 |

(List continued on next page.)

OTHER PUBLICATIONS

"Introducing Ameritech SpeakerID" Brochure, 5 pages (1995).

(List continued on next page.)

*Primary Examiner*—Melur Ramakrishnaiah
(74) *Attorney, Agent, or Firm*—Brinks Hofer Gilson & Lione

(57) ABSTRACT

A method for minimum supervision of an offender required to report in to an electronic supervision system. The method includes pre-enrolling the offender in the electronic supervision system and assigning an authorized telephone number. A telephone call is placed by an individual from a telephone located at a remote location, the remote location telephone having an originating telephone number. The telephone call from the remote location is accepted and it is determined whether an ANI of the originating telephone number is available. If available, the ANI of the originating phone number is captured. An enrollee ID number assigned to the offender is entered. The originating telephone number is validated against the authorized telephone number assigned to the offender to verify the location of the remote telephone. It is determined whether a voice template is on file for the offender. The individual is prompted to respond to a plurality of user definable inquiries regarding the status of the offender. The identity of the individual placing the telephone call is verified using voice verification technology during the telephone call.

27 Claims, 14 Drawing Sheets

U.S. PATENT DOCUMENTS

| | | | |
|---|---|---|---|
| 4,999,613 A | | 3/1991 | Williamson et al. |
| 5,023,901 A | | 6/1991 | Sloan et al. |
| 5,170,426 A | * 12/1992 | D Alessio et al. ............ 379/38 |
| 5,204,670 A | | 4/1993 | Stinton |
| 5,255,183 A | | 10/1993 | Katz |
| 5,274,695 A | | 12/1993 | Green |
| 5,333,173 A | | 7/1994 | Seazholtz et al. |
| 5,369,699 A | * 11/1994 | Page et al. .................... 379/38 |
| 5,461,390 A | | 10/1995 | Hoshen |
| 5,553,119 A | | 9/1996 | McAllister et al. |
| 5,586,171 A | | 12/1996 | McAllister et al. |
| 5,608,784 A | | 3/1997 | Miller |
| 5,646,839 A | | 7/1997 | Katz |
| 5,761,278 A | | 6/1998 | Pickett et al. |
| 5,802,251 A | | 9/1998 | Cohen et al. |
| 6,014,626 A | | 1/2000 | Cohen |
| 6,054,928 A | | 4/2000 | Lemelson et al. |

FOREIGN PATENT DOCUMENTS

| | | |
|---|---|---|
| WO | WO 88/08655 | 11/1988 |
| WO | WO 89/03530 | 4/1989 |
| WO | WO 89/11136 | 11/1989 |
| WO | WO 90/01698 | 2/1990 |
| WO | WO 90/13197 | 11/1990 |
| WO | WO 93/00663 | 1/1993 |
| WO | WO 93/05605 | 3/1993 |
| WO | WO 95/01617 | 1/1995 |
| WO | WO 95/30369 | 11/1995 |
| WO | WO 96/13819 | 5/1996 |
| WO | WO 96/14625 | 5/1996 |
| WO | WO 97/00708 | 1/1997 |
| WO | WO 97 03426 | 1/1997 |
| WO | WO 97/19547 | 5/1997 |
| WO | WO 97/25697 | 7/1997 |
| WO | WO 97/27499 | 9/1997 |
| WO | WO 97/39594 | 10/1997 |
| WO | WO 99/08183 | 2/1999 |

OTHER PUBLICATIONS

"Introducing Ameritech SpeakerID/MSR" Brochure, 3 pages (1995).

"Speakerkey—High Peformance Speaker Verification Software" Brochure, 2 pages (1997).

"Speakerkey Voice Verifier—Frequently Asked Questions," 7 pages (1995).

"Infosec—Voice Verification Fact Sheet," 1 page (1997).

International Search Report for PCT/US99/12382.

International Search Report for PCT/US99/16340.

* cited by examiner

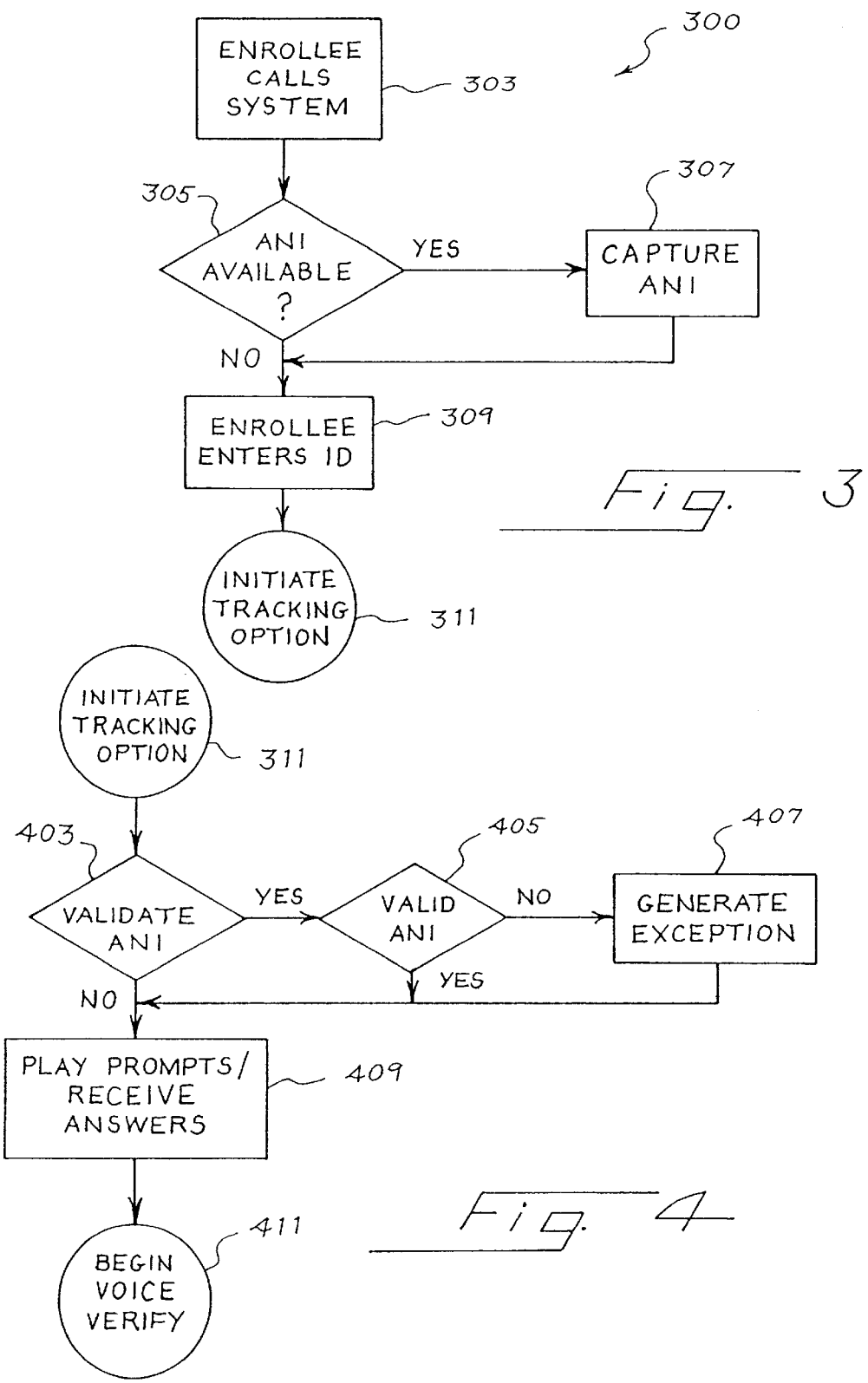

SPEAKER ID/EMS
ELECTRONIC MONITORING SYSTEM (TRACKING OPTION)

ENROLLEE REPORTS

SELECT TYPE

⊙ ALL
○ ENROLLED
○ RELEASED

REPORT SELECTIONS

⊙ ENROLLEE LIST BY NAME        ☐ INCLUDE NOTES
○ ENROLLEE LIST BY ID          ☐ INCLUDE NOTES
○ ENROLLEE LIST BY SECURITY LEVEL
○ ENROLLEE LIST BY RELEASE TYPE

[SUBMIT]

AMERITECH DEVELOPMENT
                           ENROLLEE LIST BY SECURITY TYPE

PAGE 1

SECURITY TYPE: HIGH

50 AARON, HANK
(312) 456-7890      45 N STATE                    CHICAGO IL 60603
(312) 123-4566      23 N MAIN                     CHICAGO IL 60630
RELEASED      MONITORING: MINIMUM SUPERVISION
START DATE 01/13/98     END DATE: 01/13/99     RELEASE DATE: 03/01/98

6 ADAMS, J
(603) 357-3777      123 MAIN                      CHICAGO IL 39398
PRE-ENROLL    MONITORING: MINIMUM SUPERVISION
START DATE 11/14/97     END DATE: 11/14/98

33 ATLAS, C
(603) 938-3933      1 W ELM                       LA GRANGE IL 60525
PRE-ENROLL    MONITORING: MINIMUM SUPERVISION
START DATE 12/12/97     END DATE: 12/12/98

52 DUMMY, D
(603) 939-9393      3 N MAIN                      CHICAGO IL 60603
PRE-ENROLL    MONITORING: HOUSE ARREST
START DATE 02/09/98     END DATE: 02/09/99
```

Fig. 11

NEXT SCHEDULED CALLS                     03/12/98 23:18:13

| ENROLLEE ID | CALL TIME         | DEPT. ID  |
|-------------|-------------------|-----------|
| 6           | 03/12/98 23:35:00 | AMERITECH |
| 50          | 03/12/98 23:30:00 | AMERITECH |
| 50          | 03/12/98 23:45:00 | AMERITECH |

LINES STATUS

| BOARD # | LINE | STATUS           | DATE              |
|---------|------|------------------|-------------------|
| 1       | 1    | NOT ACTIVE       | 02/10/98 14:50:00 |
| 1       | 2    | WAITING FOR CALL | 02/10/98 14:50:00 |
| 1       | 3    | ANSWER PHONE     | 02/10/98 14:50:00 |

OFFICERS [SMITH, JOHN 001 ▼]

OFFICER ID   001

LAST NAME [SMITH]

FIRST NAME [JOHN]

REPORT DESTINATION [SYSLP ▼]

STATUS [ACTIVE ▼]

OFFICER PIN [1001]

[SAVE]   [RESET]

*Fig. 15* ized telephone number and that the second calling party is the individual.

METHOD AND APPARATUS FOR SPEAKER VERIFICATION AND MINIMAL SUPERVISORY REPORTING

This application is a continuation of Ser. No. 09/119,409 filed Jul. 20, 1998.

BACKGROUND OF THE INVENTION

A. Field of the Invention

The present invention relates to the alternative confinement of criminal offenders convicted and sentenced to serve prison time for relatively minor offenses. In particular, the present invention relates to a method for verifying and identifying the presence or absence of an offender at an authorized location.

B. Description of Related Art and Advantages of the Invention

As an alternative to incarceration in costly government prison facilities, low risk offenders convicted of relatively minor criminal offenses may be sentenced to a reduced form of punishment such as home incarceration ("house arrest") or other forms or minimum supervision. With such forms of alternative sentencing, offenders are not incarcerated in a penitentiary facility, but confined to particular locations, such as their home, workplace or other like less confining location. The offenders are monitored and required to check-in with a supervising authority on a periodic basis. In comparison to house arrest, minimum supervision is generally less restrictive and may be suitable for parolees that have been released from prison.

These offenders may be required to report to a supervisory authority in a number of different ways depending usually on the type of risk the offenders present to the public, past criminal behavior or violent tendencies. For example, very low risk offenders may be required to simply mail a postcard or a questionnaire to a supervising authority agency on a periodic basis. Higher risk offenders may be required to place a telephone call from a specific authorized location to a supervisor or authorized monitoring personnel at designated times. The telephone call is received by the monitoring personnel who authenticate the caller's identity, calling location and the time of the day the call is received. Even higher risk offenders may be required report in person several times a month or week to a supervisor or other authorized personnel.

These manual supervision processes, however, have a number of disadvantages. For example, these manual reporting processes are manpower intensive, requiring monitoring personnel be available to receive and confirm the offender reporting. Manual offender reporting also requires extensive manual documentation and is therefore subject to clerical errors. In addition, it may be difficult to authenticate the identity of an offender reporting over the telephone. Moreover, where a supervising agency monitors offenders at different security levels, different types of reporting and monitoring must be administered.

SUMMARY OF THE INVENTION

The present invention relates to a method of electronically monitoring the presence of an offender. The method includes enrolling the offender in a computerized monitoring program and recording offender background data using a plurality of computer generated interfaces (CGI). The background data includes offender information and an authorized monitoring location or locations. A computer generates a telephone call to the authorized monitoring location in accordance with a verification call schedule. It is determined whether the first computer generated telephone call was received at the authorized monitoring location by a receiving party. The receiving party is prompted to verbally respond to at least one inquiry. It is verified that the receiving party is the offender. Voice verification technology is used during the first generated telephone call. It is determined whether a second computer generated telephone call should be generated to the authorized monitoring location if the first computer generated telephone call was not received at the authorized monitoring location by the offender or if the receiving party was not verified as the enrolled offender.

In another aspect of the invention, a machine implemented process for tracking a traveling offender required to make a scheduled telephone call from an authorized tracking location into an computerized tracking system is disclosed. The method includes enrolling the traveling offender in the computerized tracking system and using at least one graphical user interface (GUI) for recording traveling offender data, the offender data including authorized telephone numbers and an enrollee identification number. A telephone call is placed by a calling party from an originating telephone into the computerized tracking system, the originating telephone having an originating phone number. The telephone call is received from the calling party. The availability of Automatic Number Identifier (ANI) for originating telephone placing the originating telephone call is determined. The available ANI of the originating telephone is captured. The calling party is prompted to enter the enrollee identification number. The enrollee identification number is entered and validated. The available ANI is validated. It is determined whether the telephone call was the scheduled telephone call placed from the authorized telephone. The calling party is prompted to respond to an inquiry. A response to the inquiry is recorded, and the calling party is verified as the traveling offender.

In another aspect of the present invention, a computerized method of tracking an individual traveling between a first authorized location and a second authorized location is disclosed. The method comprises enrolling the individual in an electronic tracking program and using a graphical user interface (GUI) of the tracking program for recording the first authorized telephone number and the second authorized telephone number. The individual is authorized to place a first scheduled telephone call from the first authorized location, the first authorized location having a first authorized telephone number. The individual is authorized to place a second scheduled telephone call from the second authorized location, the second authorized location having a second authorized telephone number. A first telephone call is placed by a first calling party into the electronic tracking system, the first telephone call placed from a first telephone having a first originating telephone number. The first originating telephone number is captured. It is verified that the first telephone call is the first scheduled telephone call and that the first originating telephone call was placed from the first authorized location. Voice verification technology is used during the first telephone call to verify that the first calling party is the individual. A second telephone call is placed by a second calling party into the electronic tracking system, the second telephone call placed from a second telephone having a second originating telephone number. The second originating telephone number is captured and verified that the second telephone call is the second authorized telephone call. The second originating telephone call is verified that it was placed from the second authorized location. Voice verification technology is used during the second telephone call to verify that the second calling party is the individual.

BRIEF DESCRIPTION OF THE DRAWINGS

FIG. 3 is a flowchart of an electronic monitoring system for tracking an individual traveling among the authorized locations shown in FIG. 1;

FIG. 4 is a flowchart of the initiate tracking option of the flowchart shown in FIG. 3;

FIG. 10 illustrates one aspect of an Enrollee Report graphical user interface of the present invention;

FIG. 11 illustrates another aspect of the Enrollee Report shown in FIG. 10;

FIG. 12 illustrates one aspect of an On-Line Status Report graphical user interface of the system shown in FIG. 1;

FIG. 13 illustrates one aspect of a Set Up System Maintenance Report graphical user interface that can be utilized with the system shown in FIG. 1;

FIG. 14 illustrates one aspect of the Enrollee Supervision Set Up during Pre-enrollment graphical user interface that can be utilized with the system shown in FIG. 1; and FIG. 15 illustrates one aspect of the Individual/Supervisor/Officer Set Up Report graphical user interface that can be utilized with the system shown in FIG. 1.

DETAILED DESCRIPTION OF THE PREFERRED EMBODIMENTS

A preferred embodiment of the present invention provides criminal justice agencies with a computerized caseload management system for supervising, tracking, and/or monitoring convicted offenders participating in a community-based alternative sentencing program. Such alternative sentencing programs may include house arrest, minimal supervision, work release or curfew programs. Preferably, the system can be configured to support multiple departments and/or multiple programs within each supervisory department or agency. Alternatively, the present invention includes both an electronic monitoring system ("EMS") and a minimum supervision reporting system ("MSR"). As evident from the following description, the system is also suitable for other personnel monitoring applications such as monitoring the elderly or disabled, or verifying the attendance of employees at particular locations and times.

Figure 1:
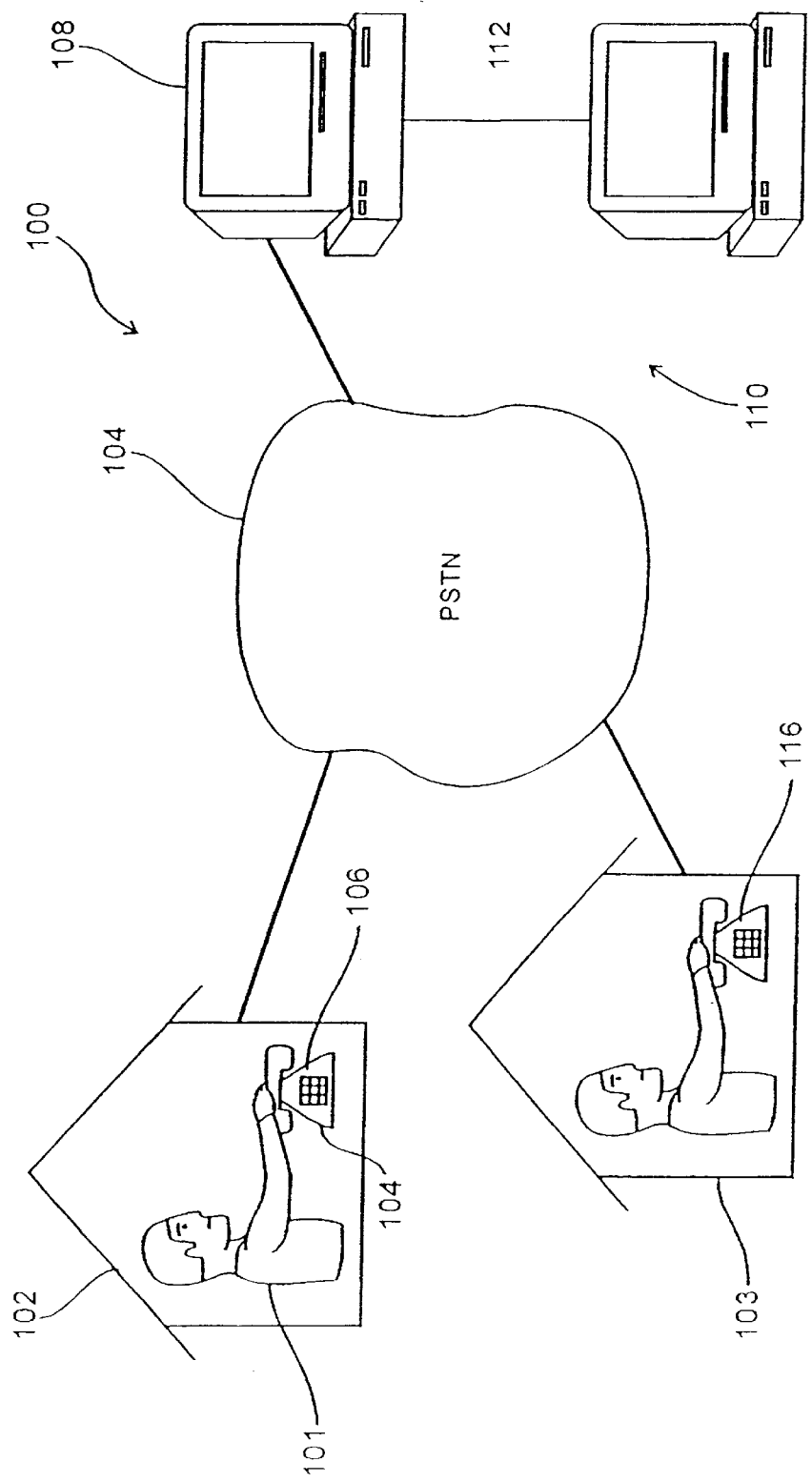
FIG. 1 shows a general overview of a system for electronically monitoring and supervising an offender, the system incorporating a preferred embodiment of the present invention.

FIG. 1 shows a general overview of a computerized monitoring and reporting system 100 incorporating a preferred embodiment of the present invention. In one aspect of the present invention, the system 100 monitors an offender 101 who has received an alternative sentence requiring detention at a particular location 102 or locations 102, 103. As shown in FIG. 1, the system 100 includes a telecommunications network such as the Public Switched Telephone Network ("PSTN") 104, a monitoring computer system 110, and a plurality of telephones 106, 116 at a plurality of detention or monitoring locations 102, 103. The detention locations or authorized locations 102, 103 are the locations where the offender or monitored personnel 101 are to be confined and should be present at various times of the day. For illustration purposes only, a limited number of locations are shown. It should be understood that a greater number of reporting locations may be provided as desired.

In a preferred embodiment, the monitored personnel 101 use a telephone 104 having a touch tone keypad 106 to report in to the monitoring system 110. Monitoring takes place by placing a telephone call from the detention location 102 or 103 over the Public Switched Telephone Network ("PSTN") 110. Preferably, the system 110 is capable of verifying the identity of a person calling in using a voice identification and verification system.

Alternatively, the personnel 101 are supervised by an agency using the telephone 106, 116 to electronically supervise the reporting and act as a caseload management system.

The computer system 110 performs the functions of pre-enrolling, enrolling, monitoring, tracking, and supervising offenders or monitored personnel 101. When used for electronic monitoring, the system verifies the presence or absence of an individual by placing an initial call to an authorized location where the monitored individual should be present. A preferred embodiment of the present invention verifies the presence of a monitored person at an authorized location. An authorized location may be the offender's residence, place of employment, the location of the agency monitoring or tracking the offender, educational institution, or other like location. Alternatively, the system may track the presence of a monitored person at a plurality of locations having authorized telephones, such as authorized locations 102 and 103.

The computerized monitoring system 110 may include a standalone computer system 108 such as an IBM compatible personal computer, or may include a plurality of monitoring computers operating over a local area or wide area network 112. Preferably, the monitoring computers 108 are dual-processor, multi-tasking units. The primary components of a preferred computer include Dual Pentium Pro/Pentium II processors with 128 Megabytes of memory, Dialogic Interface Cards and, a self-diagnostic and reporting capability. Memory storage includes five 4.2 Gigabyte Disc Drives in a level 5 RAID Array, a 3.5 Gigabyte DAT Tape Drive, an eight times CD-ROM. Concurrent remote communications to other computer devices are supported by an Ethernet LAN interface, and printer spooling are also supported. The system utilizes Windows NT having a built-in TCP/IP protocol stack supporting a variety of different access methods. Preferably, the application software runs in a Windows NT Operating System Version 4.0 environment preferably using Borland's Intrabuilder Interserver Agent and Interbase DBMS.

The system utilizes a variety of computer generated interfaces to assist in the monitoring, tracking, and supervising of enrollees. These CGI's will be further discussed with respect to FIGS. 2–9. The system may include run time VOS, run time SpeakerKey, run time Crystal Reports, and a Web Server. Communications via a single or multiple modems connected to serial ports are supported. Alternately, communications access via a Local Area Network (LAN) or via the Internet is also supported. In addition to user and password protection, a firewall may be configured into the system architecture when network access is provided.

In addition to the main computer unit, a preferred system includes a color monitor and keyboard to support date entry and retrieval; a laser printer to generate management reports and violation notifications; a sound card with amplified speakers to playback enrollment and verification failures; an Uninterruptable Power Supply to minimize any system downtime in the event of a power failure, and high-speed modems to support communications over the public switched telephone network. These peripheral devices are typically located in close proximity to the main computer although this is not mandatory.

Generally, system 110 generates a telephone call to the authorized location 102 where the supervised individual 101 is to be present. Preferably, the telephone call is generated in accordance with a call schedule derived during the offender pre-enrollment or enrollment process. For example, the scheduled telephone call may be received at an offender's residence at a certain specified time period, (e.g., thirty minutes) after the offender 101 is released from work or school. In this manner, the monitoring system 100 electronically and telephonically monitors whether the offender 101 has returned to his home within the allocated time period (i.e., 30 minutes). This telephone check-in or verification call may also be generated at a random time to the authorized location 102 so that the offender will not know in advance when the in-coming call is to be received.

At the authorized location 102, the in-coming call is received and hopefully answered. If the call is not answered, the system may generate an exception. The individual answering the check-in call may or may not be the monitored individual expected to receive the call. For example, an imposter posing as the offender may attempt to trick the system into verifying or identifying the imposter as the offender. To properly monitor the offender's presence or absence at an authorized location receiving the call, the system 100 verifies that the party answering the call is indeed the monitored individual. The system utilizes a voice verification technology that matches the voice of the person answering the telephone call with the voice of the monitored individual.

During the voice verification process in the exemplary embodiment, the system prompts the participant to repeat two paired numbers. When the receiving party repeats these numbers, the system utilizes the voice verification technology to match the speech patterns uttered in response to the prompts to speech patterns of the monitored individual previously stored in a database. If the response is matched, the system verifies that the program participant is indeed at the authorized location where the incoming, generated call is received. If the responses do not match, the monitored individual fails the verification session, and the system creates an exception. Preferably, this exception prompts the system to notify a supervisor.

The monitoring system is flexible with respect to the level of supervision the system may provide. Offender background information as well as call history information is collected, stored, and maintained for case management. The level of electronic surveillance imposed on an individual can be adjusted by increasing or decreasing the number of verification contacts required each day. Additionally, the supervising agency implementing the system may define the type and amount of offender information maintained by the system. An Ad Hoc reporting capability, to be described in detail, provides remote access to this information on demand. The system can also be tailored to the specific needs to various reporting agencies and various levels of offenders. The system is suited for a wide range of community-based alternative programs.

Pre-enrollment Process

The exemplary embodiment of the invention includes a process by which offenders are pre-enrolled in the system. Pre-enrollment consists of entering the necessary background information associated with the monitored offender, i.e., the phone number or numbers at one or more authorized locations, the verification call schedules, the security risk of the offender, the offenders supervisor, etc. This can also include demographic data, place of employment, place of residence, and other general program information. Additional information can be defined as desired by the implementing agency or the assigned supervisor.

In addition, a number of special data elements may define how the system monitors or supervises the offenders. These data elements may include, for example, a language selection that determines the language of the prompts that the monitoring system uses for enrollment and verification calls. The name of the monitored individual's supervisor is selected from a code table list and entered into the system. Also identified are the monitored individual's supervisor, associated notification number, and notification type used to report exceptions. This information may be used to report offender exceptions if the automated generation of exception notifications is selected.

During the pre-enrollment process, a supervised offender may also be assigned to one of three security levels; e.g., low, medium, or high security. The assigned security level may determine the number of verification attempts that the system allows before a notification is generated. For example, a low security level offender may be allowed four (4) voice verification failures before an exception is generated and the offender is reported as non-compliant. In contrast, a high security level offender may only be allowed two (2) verification failure before an exception is generated and communicated to the supervising agency or supervisor.

In addition, an end date may be assigned to the enrollee. The end date identifies a date by which the system will terminate the monitoring or supervising of the individual. A status field identifying the offender's status may also be provided during pre-enrollment. The individual's status determines the offender's compliance with the program and whether or not verification calls will be generated. Preferably, this field is automatically updated to reduce data entry requirements. For example, when an offender reaches his or her end date, the system can automatically change the enrollee's status from 'enrolled' to 'released' and thereby disable or inactivate the call schedule.

Following the entry of the individual's profile information, monitoring or authorized locations are defined in the system. Monitoring or authorized locations may be added by entering the telephone number and address of each authorized location. Preferably, an unlimited number of monitoring locations can be identified for each enrollee (i.e. home, work, school, a relative's residence, agency location, supervisor's location, etc.) by adding the telephone number associated with each location. Each telephone number, monitoring location, or authorized location includes a status flag to designate whether the location is active or inactive. Verification calls may be suspended (or activated) for each specific location by changing the status of the telephone number.

For each authorized telephone number or authorized monitoring location, the monitoring system can create a corresponding call schedule. Call schedules may be created for an individual day, for weekdays and weekends, or a different schedule may be created for each weekday. Preferably, the system supports an unlimited number of calling periods per day. Call frequency can also be varied for each calling period in the system. As with authorized telephone numbers, individual call schedules or calling periods include a status flag. Verification calls for a specific call schedule may be suspended (or activated) by simply changing the status. Preferably, the call scheduling process supports the entry of multiple or future call schedules.

Call-in reporting schedules requiring the offender to call into the system can also be defined. For each call-in number, a "Validate Phone Number" option is available. When the monitored enrollee calls into the system from a remote location, his or her identity is verified. The originating phone number ("ANI") is also matched against the authorized numbers previously entered for the reporting schedule. If the originating telephone number is not authorized, an exception is generated, and then reported.

The pre-enrollment process described above is the initial step performed by an operator of the monitoring system to enroll a program participant. The vast majority of data entry required by the system is entered during the pre-enrollment process. User defined code tables are used to insure data accuracy and reduce the amount of text input or typing that is required. Assuming the required information is readily available, it takes approximately two minutes to complete the pre-enrollment process in a preferred system, such as system 100 illustrated in FIG. 1. Following the pre-enrollment process, the monitored offender enrolls in the system by placing a telephone call into the system 100. Individual enrollment will be discussed with reference to FIGS. 6 and 7.

Figure 2:
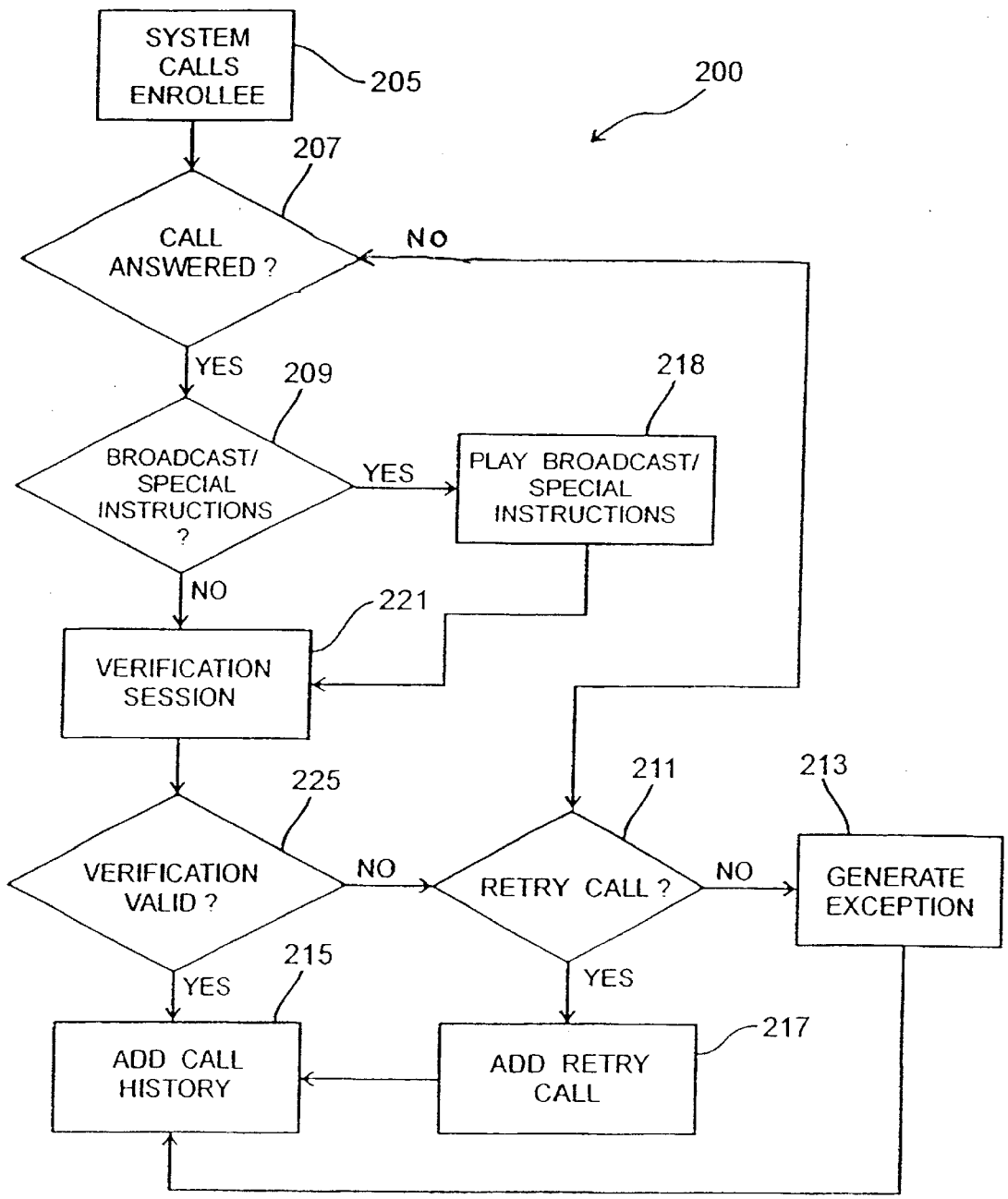
FIG. 2 is a flow chart of an electronic monitoring function for the system shown in FIG. 1.

Once enrolled, monitoring or tracking of the offender may be accomplished. FIG. 2 illustrates a flow chart of an embodiment of the electronic monitoring function 200 of the system 100 shown in FIG. 1. In this aspect of the invention, a computerized caseload management program automates the monitoring process of offenders sentenced to terms of administrative probation or minimum supervision. Referring with respect to FIGS. 1 and 2, the system 100 begins monitoring by generating a telephone call 205 to an authorized location 102 or 103. Verification calls are generated based on the call schedules established during the pre-enrollment process as previously discussed. For example, telephone calls to the monitored individual 101 may be randomly distributed throughout the calling schedule based on the length of the calling schedule ("calling period") and the number of check-in calls to be placed. Optionally, a verification call is placed at the commencement and/or end of a call schedule with the remainder of the calls distributed throughout the calling period.

In addition to randomly generating when verification calls are initiated, additional verification calls can be randomly added to an existing call schedule. Preferably, the monitoring system 100 is configured so that there is a 51% probability that an extra call is added to the calling schedule. This equates to approximately one extra call per calling period every week. It is difficult, therefore, for an enrolled offender to predict when a verification call will be placed or the number of verification calls that the enrollee will receive. In addition to the scheduled calls generated by the system and the randomly generated additional verification calls, verification calls may be manually added for a specific time using a call maintenance facility option incorporated into the system 100. The call maintenance facility allows for the manual entry of a call or calls to be placed at specified times during the current day and/or the deletion of calls that have been automatically scheduled for the current day.

Once the verification call is placed, the system 100 waits for the check-in call to be answered. If the incoming verification call is not answered at step 207, the system 100 proceeds to step 211. At step 211, the system 100 may attempt to retry the scheduled call. The retry option 211 is user configurable and is preferably configurable according to the security level assigned to the monitored individual 101 during the pre-enrollment process. For example, a low security level individual may be allowed four (4) failures before an exception is generated and communicated to supervisory personnel. A high security level individual may only be allowed two (2) failure before an exception is generated.

If the verification call is answered and a second verification call is not to be placed at step 211, the monitoring system 100 generates an exception at step 213. After an exception is generated, the system adds the exception and other relevant data to the individual's call history at step 215.

If the verification call is to be retried at step 211, the system 100 attempts to initiate a second verification call. The system returns to step 207 to place another call to the authorized location. If the retry verification call is still not answered, the system returns to step 211. If the system is not programmed to attempt another retry call, the system generates an exception at step 213, which is then added to the offender's call history at step 215. An offender's call history report contains the status of the check-in verification calls placed to the offender and is recorded, maintained, and continually updated for each enrolled program participant.

Returning to step 207, if the call is answered at the authorized location, the system proceeds to step 209. At step 209, the system determines whether the broadcast/special instruction option is currently enabled for the individual being monitored. As with the certain other system options, the broadcast option is user defined and may contain a desired outgoing message. If this broadcast option is currently activated for the enrollee being called, the system proceeds to play out the broadcast. Alternatively, this option could play out special instructions for the caller at step 219. Such broadcasts or special instructions may inform the enrollee of changes to his or her supervising program, or request that the enrollee contact his supervisor. After the broadcast step 219, the system proceeds 100 to step 221 to begin the voice verification session.

At step 221, the verification session verifies the identity of the individual receiving the phone call, preferably by way of a voice verification system. For example, the individual may be asked to repeat two paired-number prompts generated by the system (e.g., 21–45, 23–54, etc.) as performed during the individual enrollment process. The monitoring system 100 then matches the speaker with the voice templates for the monitored individual previously generated during the enrollment process. The monitoring system preferably incorporates "SpeakerKey" the voice verification technology developed by ITT's Aerospace Communications Division.

It should be understood that other voice verification technologies are also suitable with the present embodiment.

At step 225, the system determines whether the voice verification 221 was successfully completed. If the voice verification fails, the system may attempt a call retry at step 211. The retry call option 211 is user definable and may be enabled or disabled for a particular individual as previously described. If the retry option 211 is currently activated, the system 100 returns to step 207 and places another call 205, re-attempting voice verification 211. If the system attempts a call retry at step 211, a call retry 217 is generated and added to the offender's call history 215. If the retry option is not activated, an exception is generated 213 and added to the offender's call history 215.

If the verification process 221 was successful at step 225, the call history is updated 215.

Tracking Option

In another aspect of the present invention, the monitoring system 100 shown in FIG. 1 tracks an offender 101 among a plurality of authorized telephone numbers 102, 103 at scheduled times. Preferably, this mode of monitoring is designed to track the individual 101 who has been authorized to travel among authorized locations 102, 103 at selected times of the day. Offenders who have been authorized to travel among a plurality of authorized locations are required to place incoming telephone calls to the monitoring system 100 so that their arrival and presence at the selected locations can be verified.

The tracking feature of the monitoring system may be used in a variety of different types of applications. For example, the tracking feature can implement Scheduled Reporting or Timed Reporting of individuals traveling to different job locations. With Scheduled Reporting, individuals may be required to call into the monitoring system at scheduled times during the day (e.g., from 10:00 to 10:10 AM and 3:00 to 3:15 PM). With Time Reporting, predetermined "travel" times can be authorized by the supervising agency. Offenders are then required to call into the system when they depart an authorized location. The system can then schedule the next call to be received, based on the "travel" time allotted. The system then expects to receive a follow-up call once the offender arrives at the desired destination.

For example, a monitored individual may be authorized to travel among several authorized locations 102, 103 as shown in FIG. 1. While traveling among the various authorized locations, the individual must initiate check-in telephone calls at specified times. For example, the individual may be required to place a check-in call when he or she departs from a first authorized location, such as location 102, and when he or she arrives at a second authorized location, such as location 103. The monitoring system 100 may be programmed during the pre-enrollment process to expect to receive a first telephone verification call from a first authorized telephone at a certain time of the day and expect to receive a second telephone verification call from the second authorized telephone at predetermined time later in the day. This call schedule could be defined in accordance with the data entered during the pre-enrollment process The predetermined later time may correspond to a range of anticipated travel times between the two authorized locations. Of course, travel among a plurality of authorized locations may also be tracked.

FIG. 3 illustrates a flowchart 300 of an electronic monitoring system implementing the tracking of a monitored individual traveling between various authorized locations. The tracking process 300 begins when the individual places an initial check-in telephone call at step 303. The initial call is placed from an originating telephone to the monitoring system 100. The monitored individual may place this call, preferably a scheduled call, from either an authorized or an unauthorized location. In a timed reporting scheme, a predetermined "travel" time is authorized by a supervising agency for the monitored individual to travel from the first authorized location to the second authorized location. Typically, the individual may be required to call into the system when he departs from the first authorized location. The system will then schedule a follow-up telephone call to an authorized telephone number at the second authorized location. The scheduling of the follow-up call to be received at the second authorized location is based on the "travel" time allocated for the individual to travel to the second location. Alternatively, the tracking system requires the individual to call into the system from an authorized telephone number after reaching the destination location.

Upon receiving the call, the system 100 captures the originating telephone number. The system 100 verifies the telephone number against a list of authorized numbers to determine whether the individual is indeed at an authorized location. If a follow-up call is not received from an authorized location, or if the originating phone number of the originating phone has not been verified, or if the voice verification fails, the system creates an exception. This exception is stored in the individual's call history and a supervisor may be automatically notified of this exception.

At step 305, incoming telephone calls to the monitoring system 100 are checked to determine whether the Automatic Number Identification ("ANI") of the telephone originating the incoming call is available. ANI identification allows the system to determine the telephone number of the originating the call and thus whether the call was placed from an authorized location. The ANI is included in the dialing string of digits sent to the telephone company's central office switch. Depending on the type of central office switch the ANI may or may not be passed through the switch. If the ANI of the telephone originating the telephone call is available, the system captures the ANI at step 307. If the ANI of the originating telephone is not available, the system proceeds to step 309.

At step 309, the calling party placing the incoming call enters an assigned enrollee identification number. Each program participant is assigned a unique enrollee identification number. After entry of the enrollee identification number 309, the system 100 verifies the enrollee identification number as an "active" program participant and then initiates the tracking option at step 311.

Now referring to FIG. 4, at step 403 the system 100 determines whether a captured ANI is valid. The validation of the calling ANI is a system option that can be activated or deactivated depending on the individual being tracked. To verify a tracked offender's presence at a specific location, the ANI option is activated. If the ANI validation option is activated, the monitoring system 100 verifies that the ANI of the originating telephone is a telephone number that has been authorized and therefore valid. If the monitoring system determines that the captured ANI is not an authorized telephone number, and therefore not valid, the system 100 generates an exception at step 407. At step 407, the system 100 generates an exception, thereby signaling that the monitored individual is not at an authorized location. The system then proceeds to step 409. If the captured ANI is valid, the system 100 proceeds to step 409 without generating an exception.

At step 409, the system plays out prompts and receives answers to the prompts from the caller. The responses are recorded and used to verify that the caller is indeed the individual being monitored. The monitoring and tracking system supports an unlimited number of prompts, inquiries, or questions that an enrolled offender may be asked during a check-in call, such as the one placed at step 303 (FIG. 3).

The prompts or questions may be defined during offender pre-enrollment and may be modified at any time. For example, a new prompt may be added by simply adding the new prompt to a user defined code table and recording the desired prompt. A "user defined code table" is a list of valid codes that may be entered into a data entry field in the SpeakerID application. When a data entry field is designated for code table validation, only a value that is included in the table may be entered. If the table is "user defined", the end user can add new codes to the table. Preferably, the prompts and the ordering of the prompts are user definable and can be individualized for each monitoring system enrollee.

The electronic monitoring and tracking system also allows a supervisor to define the specific type of data recorded by the system during step 409. Once recorded by the system 100, this specific data is made available for management and program reporting as will be more fully described. In addition to the data required by the system (approximately 10 data elements), a supervisor can define a number of additional data elements to be recorded and further define the validation criteria for each of the new data elements defined. Therefore, the system can be configured to meet specific case management needs.

After the system plays out prompts and records the calling party's answers at step 409, the system 100 then begins the voice verification process at step 411.

Figure 5:
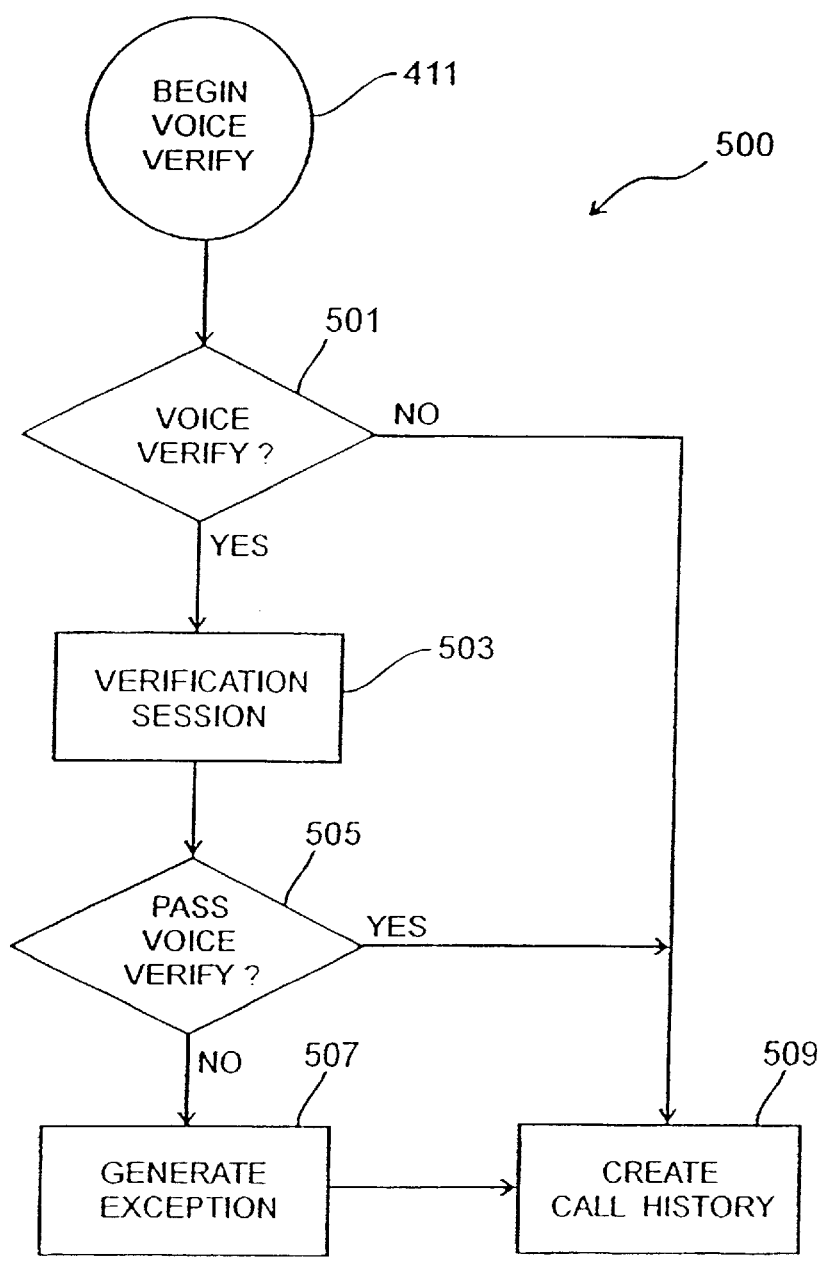
FIG. 5 is a flowchart of a voice verification subroutine program once an individual responds to the flowchart shown in FIG. 4.

FIG. 5 illustrates a voice verification process for verifying the voice of the party placing the incoming check-in call. Voice verification is an option and is user definable, it may be activated or deactivated for each program participant. For example, if the offender being tracked has been assigned as a low or medium risk offender, he or she may not be required to go through the voice verification option. Alternatively, a high-risk offender would be required to go through the voice verification procedure. The system will then proceed directly to step 509 the offender's call history is updated.

Alternatively, if the offender placing the call-in is a high-risk offender and is required to go through the voice verification session, the system proceeds to step 503. At step 501, the voice verification process begins. At step 503, the voice verification process of the tracking option is similar to the voice verification session previously described with reference to FIG. 2. If the party placing the in-coming call fails the voice verification process at step 505, an exception is generated at step 507 and then the offender's call history is updated at step 509.

If the system verifies at step 507 that the party placing the call is indeed the individual being tracked, and the scheduled verification phone call was timely received and placed from an authorized telephone, the individual has successfully checked into the system. The system proceeds to step 509 to add this successful check-in information to the call history.

Call History Reporting Process

The call history reporting process provides the ability to produce reports and program statistics regarding program enrollment, call generation activity, and enrollee call verification results. For the monitoring and tracking system, five main categories of reports are available: Enrollee Reports, Date Range Reports, Call History Reports, Tracking Reports and Supervisor Reports.

The present invention utilizes various graphical user interfaces to enter text and may generate various types of reports. The first type of report, Enrollee Reports, provides information regarding the individual characteristics of the enrollees monitored by the system. The graphical user interfaces shown in FIGS. 10, 11, and 12 are representative of the information contained in such report parameters. Report parameters can identify the enrollees to be included on the report based on their current status. Referring to FIGS. 10, 11, and 12, the various report options available include:

| | |
|---|---|
| Alphabetic List | This list produces an alphabetized list of all selected enrollees. |
| Enrollee ID List | This list provides a list of all selected enrollees and associated information, sorted by Enrollee Identification Numbers. |
| Security Level | This list provides a list of all selected enrollees and associated information, sorted by their Security Level. |
| Release Type | This list provides a list of all released enrollees and associated information, sorted by their Release Type. |

The second type of report, Date Range Reports, provide statistical and program management information regarding the number of past and current individuals monitored by the system. Report parameters identify the reporting period of each selected report. The Date Range Report options include:

| | |
|---|---|
| Start Dates | This list provides a list of all enrollees that added or enrolled in the system during the time frame specified. |
| End Dates | This list provides a list of all enrollees that have end dates scheduled during the time frame specified. |
| Release Dates | This list provides a list of all enrollees that were released from the system during the time frame specified. |

The third type of reports, Call History Reports, provide the operational data and call history detail records necessary to administer an effective monitoring program. Report parameters identify the reporting period for each selected report. Reports may be generated for a day, a week, a month, a year, etc. The call history report options include:

| | |
|---|---|
| 24 Hour Reports | This report provides all verification calls that were placed, and the result of each call, each day during the selected reporting period. |
| Call History | This report provides all verification calls that were placed, and the result of each call, for a specific enrollee during the selected reporting period. Call history reports can also be generated for all enrollees assigned to a specific program type. |
| Notification | This report provides all verification calls that resulted in an exception and resulting notification during the selected reporting period. |
| Enrollee Exception | This report provides all verification calls for a selected enrollee that resulted in an exception during the selected reporting period. |
| Officer Exception | This report provides all verification calls that resulted in an exception for all enrollees assigned to a specific officer during the selected reporting period. |
| Call Summary | This report provides all active enrollees, the number of days they were active, the total number of verification calls place and the result of each call during the selected reporting period. |

The fourth type of report, Tracking Reports, provide the operational data associated with offenders that are required to call-in to the EMS system from remote locations. For example, FIGS. 13 and 14 illustrate one such report type. Report parameters identify the reporting period for each selected report. Reports may be generated for a day, a week, a month, a year, etc. The tracking report options include:

| | |
|---|---|
| Enrollee Summary | This summary provides all enrollees required to report in from remote locations and their associated call-in schedules. |
| Enrollee Exception | This report provides all enrollees that failed to comply with their reporting schedule, called from unauthorized phone numbers or failed their voice verification session. |

The last type of report, such as the Supervisor Report graphical user interface shown in FIG. 15, provides caseload management information based on current and past program enrollments. Report parameters identify the enrollees to be included on the report based on their current status. The Supervisor Report options include:

| | |
|---|---|
| All | This report provides all selected enrollees assigned to every supervisor entered on the system, sorted by supervisor. |
| Officer List | This report provides all selected enrollees assigned to specific supervisors selected off the officer list. |
| Unassigned | This report provides only the enrollees that are currently unassigned. |

Minimal Supervising Reporting System

In still another embodiment of the present invention, the system shown in FIG. 1 operates as a Minimal Supervising Reporting ("MSR") system. In this present example, the MSR system automates the reporting process of relatively low risk criminal offenders sentenced to terms of administrative probation or minimum supervision. According to the terms of an enrollee's supervision, the offender or enrollee is required to place a check-in telephone call to the MSR system at scheduled times of the day or on certain days of the week or month. The terms of the offender's supervision and his check-in schedule are defined to the MSR system during a pre-enrollment process, such as the pre-enrollment process previously discussed.

Generally, the MSR system accepts incoming telephone calls from a calling party and determines whether the ANI of the originating phone number is an authorized telephone number for the offender placing the call. The calling party is then prompted to respond to a series of individualized questions. The identity of the calling party is then verified using a voice verification technology. Preferably, the voice verification technology is the same technology utilized in the monitoring and tracking system previously discussed and described with reference to FIGS. 1–5.

The MSR system allows offenders to comply with their sentencing requirements without making a physical appearance at the supervising agency or before a supervisor. Physical reporting can be eliminated because the MSR system can verify the time, the offender's identity, as well as the validity of originating telephone numbers.

Figure 6:
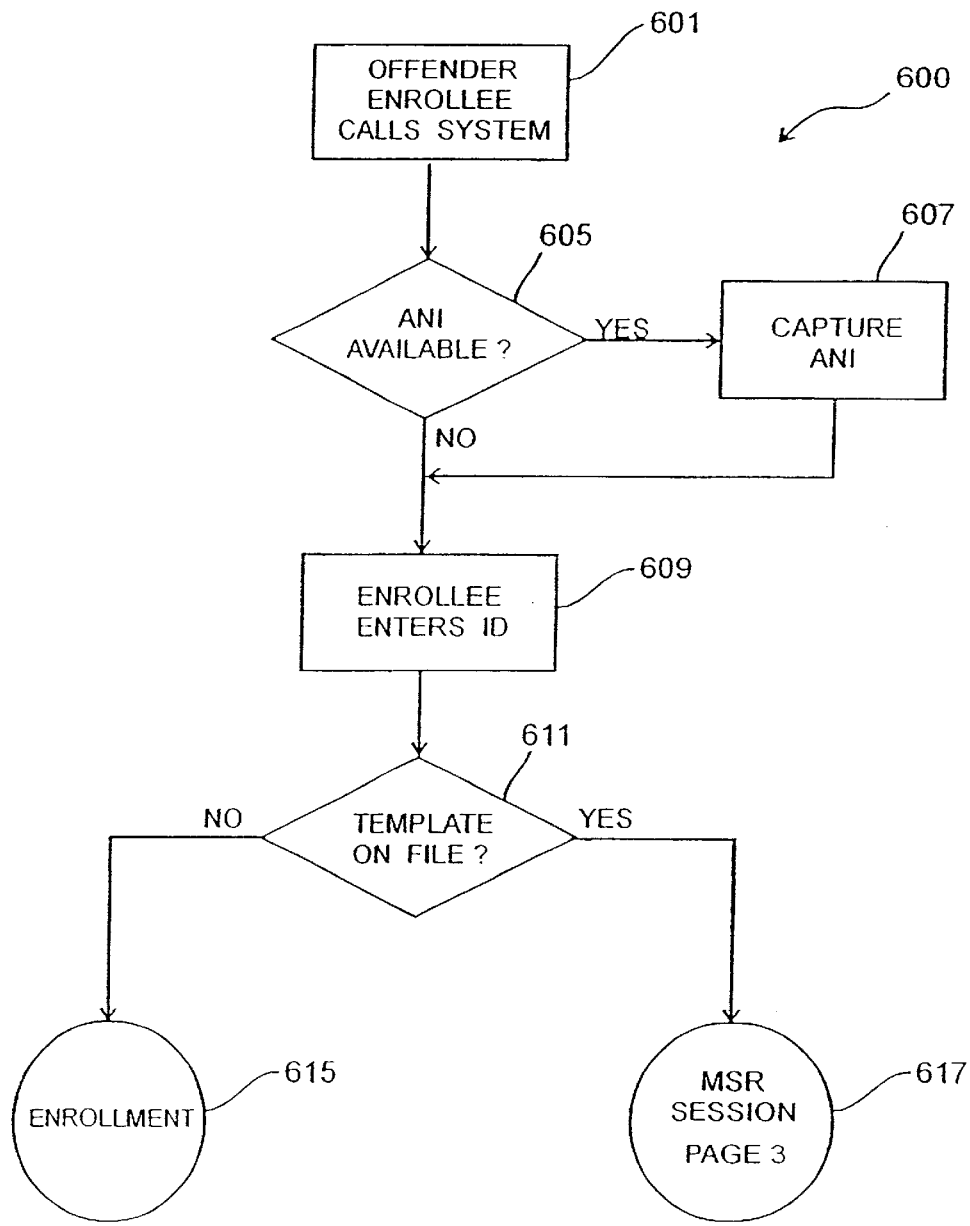
FIG. 6 is a flowchart of a reporting function of an electronic monitoring or tracking system, such as the system shown in FIG. 1.

FIG. 6 illustrates a reporting flowchart 600 of an exemplary embodiment of the MSR system automating the check-in reporting of offenders sentenced to terms of minimum supervision. It should be understood that monitored individuals should be pre-enrolled into the program as described previously above. If the individual has not been pre-enrolled in the program, the pre-enrollment procedures previously discussed must be performed.

At step 601, the individual on supervision places a telephone call into the system from an originating telephone having an originating telephone number. The supervising system answers the incoming call and determines whether the ANI of the originating telephone is available at step 605. If the ANI is available, the system captures the ANI at step 607. The ANI allows the system to determine whether the incoming check-in call is placed from a list of authorized telephone numbers. For example, the captured ANI of the calling party's telephone may be compared to a list of authorized telephone numbers previously authorized by the agency for that particular offender or individual. If the telephone number validation option is activated and a check-in call is received from an unauthorized ANI telephone number, an exception is created and a supervisor may be notified.

Regardless of whether the ANI is available or not, the system proceeds to step 609 to obtain the enrollee identification number of the calling party. As previously described, each individual enrolled in the program is assigned a unique identification number. At step 609, the system plays a brief introductory message and prompts the caller to enter a password, preferably the caller enters the enrollee identification number. After an identification number is entered at step 609, the system determines whether a voice template is on file that corresponds to the enrollee identification number 611. If a voice template is on file for the caller's identification number, the system begins the MSR verification session at step 617 and described below in connection with FIGS. 8 and 9. If a voice template is not on file, a template must be created at step 615.

Individual Enrollment

Figure 7:
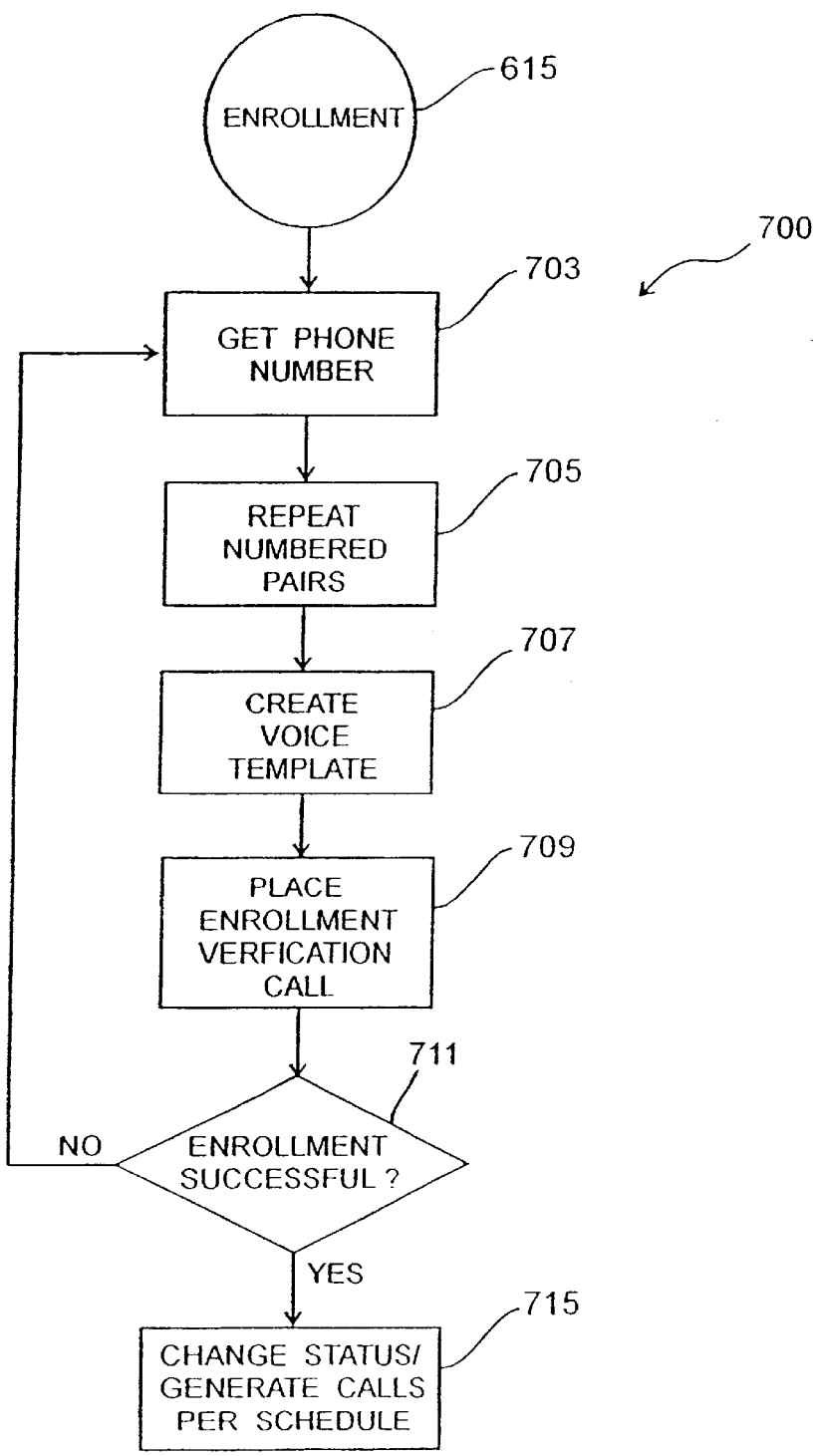
FIG. 7 is a flowchart of an enrollment process for the system shown in FIG. 1.

If the caller's voice template is not currently on file, the system begins the enrollment process at step 615. FIG. 7 illustrates a flowchart for the individual enrollment process 700. At step 703, the system 100 prompts the caller for the telephone number that he is calling from. This telephone number may be a telephone number used only during the enrollment process and need not necessarily be one of the authorized telephone numbers used during the verification process.

After a telephone number is entered at step 703, the system asks the enrollee to repeat a sequence of paired-numbers, i.e. 21–45, 23–54, etc.) at step 705. For example the system may prompt the caller as follows: "Please repeat 26, 31". Preferably, the system prompts the caller to repeat a total of twelve paired number sequences. At step 707, the system collects the caller's verbal responses and creates a voice template of the caller's speech. This process of creating the voice template takes about five minutes to complete. After the caller has completed responding to these prompts, the system informs the caller that the enrollment process has been successfully completed.

At step 709, the system performs an enrollment verification by placing a telephone call back to the enrollee at the telephone number that was entered at the beginning of the enrollment process at step 703. Preferably, this enrollment verification telephone call is placed within five (5) minutes after the enrollee completes the verbal responses at step 705. At step 711, the system begins an enrollment verification session to insure that valid enrollee voice templates were created during step 707. The verification step 711 may repeat the same or similar number sequences as the voice template creation steps 705 and 707 to verify the voice templates. Following successful completion of the enrollment verification call at step 715, the system automatically changes the enrollee's status to 'enrolled' and generates a call schedule based on the call schedules entered for the enrollee during the pre-enrollment process. If the enrollment verification call is not successful, the enrollment process is repeated.

With the present embodiment, individual enrollment can take place from a variety of different locations. For example, the enrollee may enroll from his supervisor's office, his home, or even the jail where he is presently being detained. This flexibility reduces the need for supervisory personnel of the implementing agency to manually enroll the enrollee's. This also significantly decreases the amount of time required to add a person to the monitoring program. In a preferred system, the entire enrollment process takes approximately ten (10) minutes. In addition, multiple enrollments can be conducted by the system concurrently.

Figure 8:
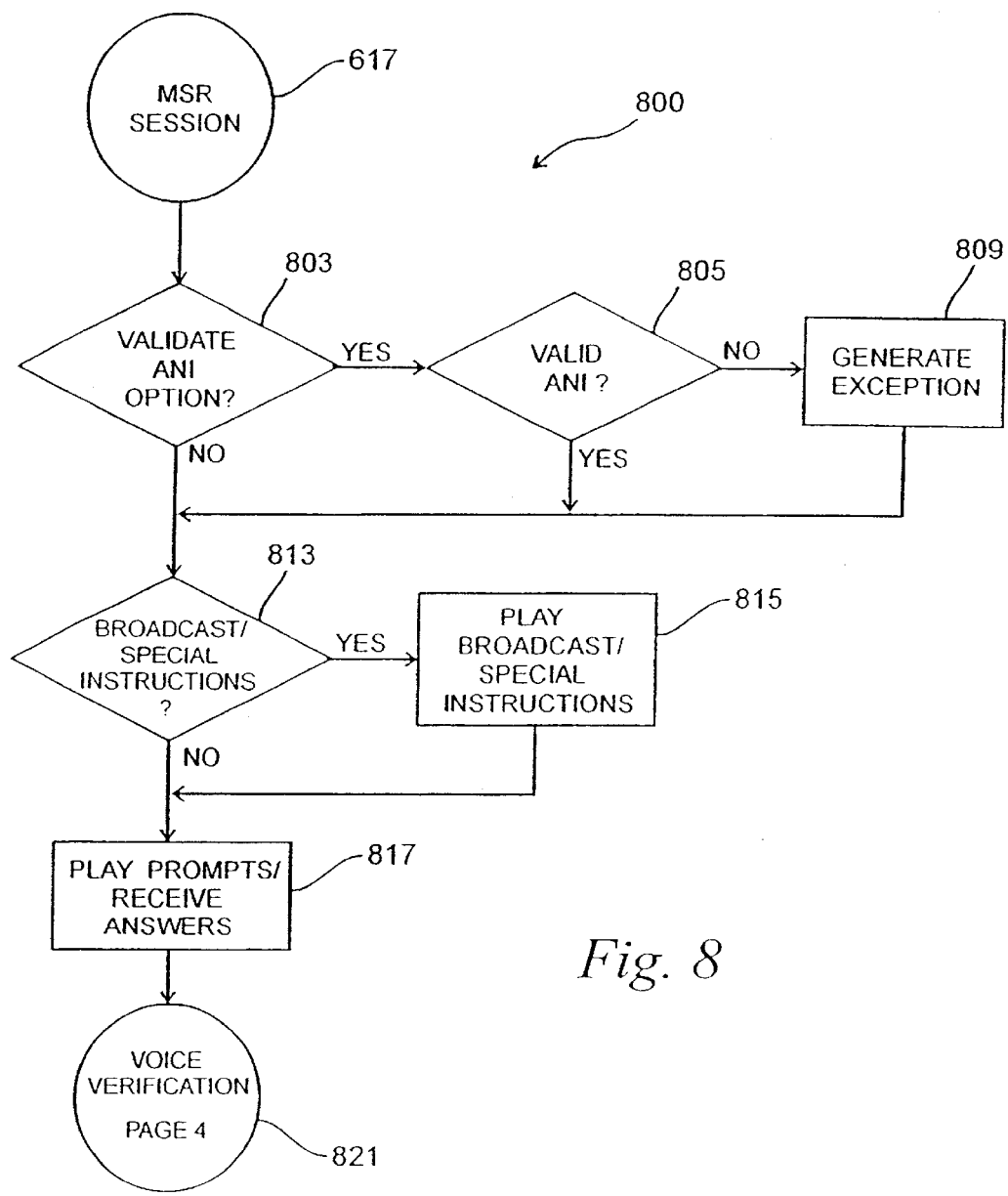
FIG. 8 is a flowchart of the voice verification process shown in FIG. 7.

Returning to FIG. 7, if a voice template is on file 611, the system begins the MSR session 617. Referring now to FIG. 8, illustrated is an exemplary embodiment of the MSR verification session. The first step of the verification session is to determine whether the "validate phone number" option 803 is enabled. If the "validate phone number" option for the offender assigned the enrollee identification number has been activated at step 803, the system determines whether the captured ANI is valid. As previously discussed, the system has captured the caller's originating telephone number (step 607 in FIG. 6). At step 805, the ANI is validated by comparing the captured ANI telephone number against a list of authorized telephone numbers for that enrollee. If the captured ANI does not match one of the enrollee's authorized telephone numbers, the system generates an exception at step 809 and proceeds to step 813. If the captured ANI is a valid authorized number, the system proceeds to step 813. Preferably, the system displays a data entry screen showing the authorized phone numbers previously recorded during program enrollment for the offender.

At step 813, the system determines whether the broadcast/special instruction option is activated for the particular enrollee. If the broadcast/special instruction option has been activated, the system plays out any prompts or special instructions that have been programmed at step 817. The caller responds to these prompts and the system receives and records the caller's answers. After the caller's answers are received, the system begins the voice validation process at step 821.

Figure 9:
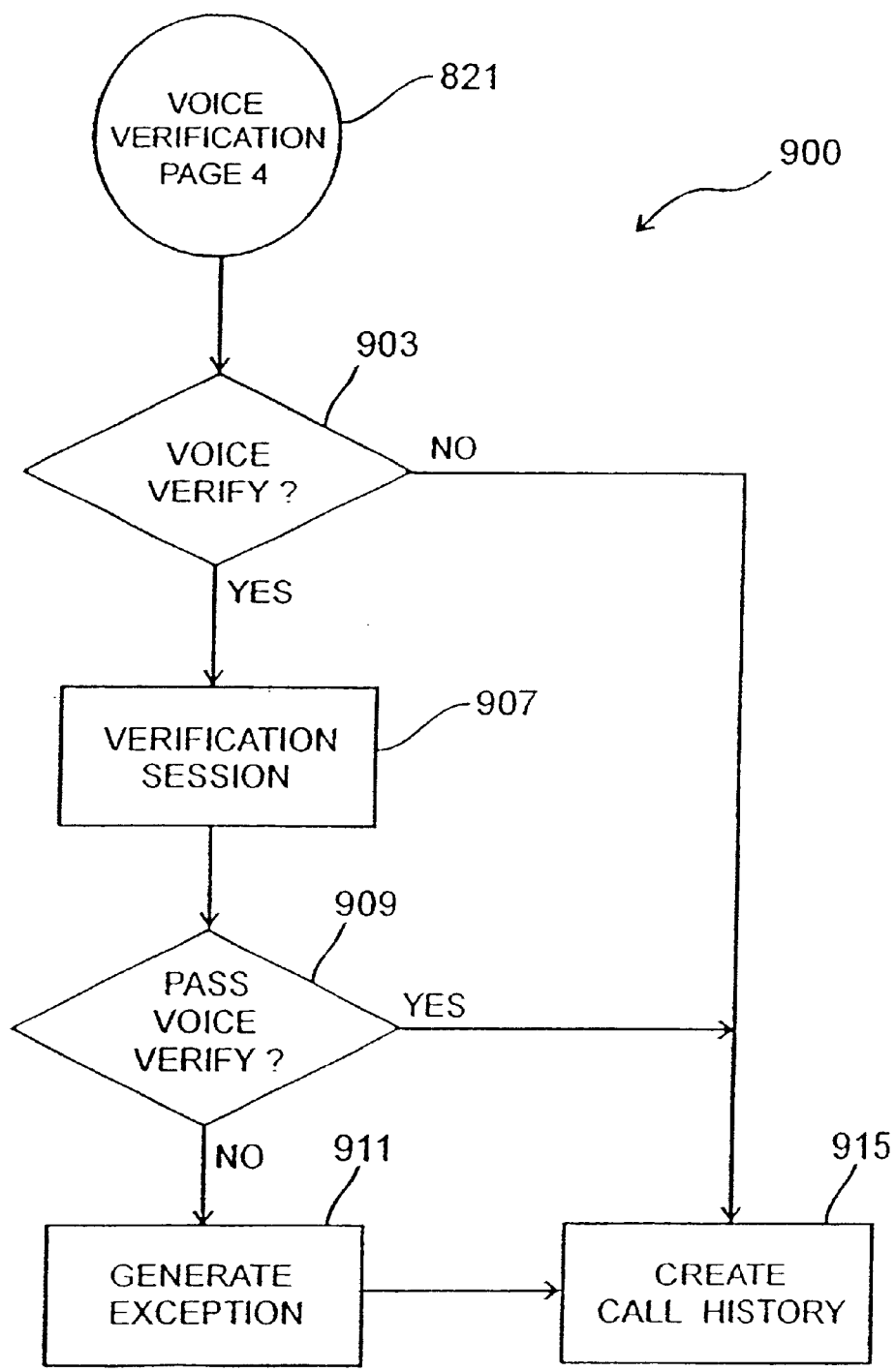
FIG. 9 is a flowchart of a voice verification process for the reporting function flowchart shown in FIG. 1.

FIG. 9 illustrates an exemplary embodiment of the voice validation process used to authenticate the identity of the caller placing the check-in call. The system preferably uses the voice verification process previously described above. At step 903, the system determines whether the voice verification option has been activated for the caller. If the validate voice option has been activated, the system begins the voice verification session 907. During the voice verification process, the calling party is asked to repeat a series of paired numbers. The system compares these verbal responses to the caller's stored voice template generated during the enrollment process. If the voice verification technology determines that there is no match between the caller's responses and the stored voice templates, the system generates an exception at step 911 which is reported and added to the offender's call history 915. The system may return to step 903 to re-attempt voice validation. "Validate Voice" Option If the "Validate Voice" option has been selected for an enrollee, a voice template of the enrollee is created. In a preferred embodiment of the present invention, the template creating process is incorporated into the standard reporting program. An offender's voice template creation does not, therefore, require any manual intervention. However, preferably for security reasons, supervised enrollment of the voice template should be initiated. When a calling party places his/her check-in or enrollment call to the MSR system and enters the enrollee identification number, the system ascertains whether the validate voice option been selected for the enrolled offender. The system then determines whether there is currently a voice template on file in the system.

If no voice template is on file, the system proceeds to the enrollment process 615 illustrated in FIG. 7.

The system first prompts the enrollee for a telephone number 703. Preferably, this is the telephone number that the enrollee is placing the call from. After the offender enters the telephone number 703, the system prompts the enrollee to repeat a total of 12 paired number sequences 705. After the enrollee responds to these prompts, the system creates the template 707 and states that participant enrollment is successful. The system then terminates the call. With the present invention, the Voice Verification process takes approximately 1 minute to complete.

Based on the enrollee's verbal responses to the system prompts during step 705, the system creates a voice template for that individual 707. Following the creation of the voice template, the system then calls at step 709 the telephone number that was entered by the enrollee during the initial enrollment or compliance call during step 703. The system then conducts an enrollment verification session 711. Preferably, the enrollment verification session call is placed five (5) minutes after the enrollee completes the verbal responses at step 705. The enrollment verification session is conducted to insure that a valid voice template has been properly created for the enrollee.

As previously discussed with reference to the monitoring and tracking process illustrated in FIGS. 2–5 and the MSR system shown in FIGS. 6–9, the system creates various exceptions. Once an exception is generated, the system can provide the relevant authorities or agencies with a number of different types of notices or reports. For example, if the computerized caseload management system does not receive a scheduled offender's check-in call, or if the voice verification fails, or if the system does not authorize the ANI of the originating telephone placing the scheduled call, an exception is created. As previously discussed, this exception is preferably stored in an offender's case history. Aside from storing this information in the offender's case history, the system also notifies the offender's supervisor that an exception was generated. Preferably, a supervisor is automatically notified if an exception is created. A supervisor notification may also be generated when there is a change in the status of the calling party. However, an offender's status change may not necessarily be treated in the same manner as exceptions.

Customized Reporting Criteria

The present invention allows supervising agencies to select and individualize a plurality of prompts, inquiries or questions during the call sessions. These individualized prompts may be asked of each individual offender during call in. The system may vary the sequence or order in which the questions are asked during call-in. The questions or inquiries may be tailored or customized for each offender. In addition, the system supports agencies to develop new questions or questions customized to the needs of a particular agency or to the particular circumstances of the offender. For example, this customized reporting allows agencies to tailor the MSR system to specific case management needs. The system also provides for individualized offender status information.

Like the EMS system, the MSR system allows a supervising agency to define the specific data to be captured by the system. In turn, the captured data is made available for management and program reporting. In addition to the data required by the system (preferably approximately ten (10) data elements), a supervising agency defines an unlimited number of data elements for each offender. These additional data elements further define the validation criteria for each of the new data elements defined. This function allows each agency to configure the system to meet the agency's specific programmatic and caseload management needs.

Remote Access to Status Changes

After the system determines that offender enrollment is successful at step 711, the system prompts the caller to answer a number of questions relating to the offender's program status at step 715. If there is a change in the program status of the offender, the system prompts the offender for the new or revised information. For example, the individual may be asked to "Please state your new address" or "Please state your current marital status." The offender's response is recorded by the system. Once this information is recorded, the system notifies authorized personnel such as a supervising agency or a supervisor that a change in offender status has been identified and recorded. Preferably, the agency or supervisor is notified automatically once the offender provides this new status information to the system.

Various methods are available to retrieve the offender status information from the system. For example, authorized personnel such as the offender's supervisor can retrieve stored system information by calling into the system. A call can be placed using any telephone and requesting offender data. Remote access to offender status and system information from any telephone has a number of advantages. For example, remote access insures that an offender status change is timely reported. Also, remote access allows authorized personnel a convenient and timely method of data retrieval.

Notification Processing

In another aspect of the present invention, the monitoring system allows authorized personnel or supervisors to schedule and define how they are notified of exceptions. Therefore, notification can be scheduled according to the specific day of the week and/or the specific time of day. Preferably, notification is user definable based on the offender. For example, for potentially dangerous or high-risk offenders, authorized personnel may wish to receive a notification immediately. The authorized personnel may therefore wish to be paged immediately during any time of the day. On the other hand, authorized personnel may determine that a status change with respect to some lesser degree or lesser risk offenders is not that critical and therefore no notification is required.

The variable notification process gives authorities the ability to select the method of notification. Notification can therefore take into account a supervisor's schedule. For example, during a given day, a supervisor may elect to receive exception reports on an office printer. These reports can be received either during normal business hours or off-hours. The next day, the officer may elect that he or she be notified by being paged after hours, on weekends, or when he or she is away from the office.

The system also supports multiple notification processes. These notification processes include automatic report generation, automatic paging, automatic fax generation, and automatic call generation.

Authorized personnel may also schedule when and how they are notified of any change in offender status. Preferably, the system does not treat offender status changes in the same manner as the system treats exceptions. For example, exceptions may be reported immediately. Offender status changes may be viewed as being less critical nature. Consequently, supervisors may only want to be notified of status changes during normal business hours. The MSR system of the present invention allows officers to schedule how they will be notified of status changes based on the specific day and/or time of day. When an offender status change occurs, the system checks the officers "Mail schedule". The system holds or delays supervisor notification until a delivery system coincides with the supervisor's schedule.

System Advantages

The present invention offers a number of advantages. For example, the system does not require any special remote electronic equipment or offender worn devices. Hardware maintenance costs, inventory control problems and the time and cost associated with installing and revising electronic devices from the program participants' residence is therefore reduced. The system also allows offenders to comply with mandated reporting requirements by placing a scheduled call from any telephone. Because the proposed system verifies both an offender's identity and the originating calling numbers, physical reporting of offenders may also be reduced. Therefore, the present invention decreases the amount of administrative and clerical overhead that can be required for a typical caseload management reporting system.

In addition, with MRS, the monitoring agency has minimal up-front capital expenditure for system implementation. For example, offender call-ins may be placed from regular, standard telephones. Moreover, the system may accommodate an unlimited number of program participants.

The proposed system automates the routine processing associated with a program participant once the individual is enrolled in the program. For example, the system automates reporting compliance, exception reporting, release from the program, and program re-enrollment. The present invention thereby minimizes the amount of administrative support required for an offender supervising system. The system also allows the implementing agency to define the type and amount of offender information that is collected and maintained. Therefore, the system may be tailored to meet the specific needs of each agency and/or each program.

Preferably, the MSR system comes complete with the hardware and software necessary to implement and automate a caseload management program. Additionally, the MSR system may be configured to support multiple agencies or departments. The system can also be configured to support multiple programs within each department or agency.

Exception Notification

As discussed, both the EMS system and the MSR system generate exceptions. For example, where the system illustrated in FIG. 8 fails to validate the ANI or where the system shown in FIG. 9 fails to verify the voice of the party placing the call, the system creates an exception. Preferably, the system automatically notifies a monitoring agency and/or a supervising authority of any exceptions. There are four other basic types of exceptions that cause the system to notify agency personnel.

The first exception type is generated when an offender fails to comply with the reporting schedule. The second type of exception is generated when a party placing a check-in call fails the voice verification. The third type of exception is generated when a check-in call is placed from an unauthorized phone. The fourth type of exception is generated when there is a change in an offender's status or information. To generate these exceptions, the appropriate option within the system must be activated when the call is placed.

System Implementation

The system 100 shown in FIG. 1 may be implemented in a number of different ways. For example, the system 100 may be implemented by placing a monitoring computer on the implementing agency's premise. Alternatively, the vendor, licensee, contractor, or subcontractor of the monitoring system may provide the monitoring service to the monitoring agency. For example, in a preferred embodiment, SecurityLink™ from Ameritech provides the monitoring service using the host processors located in various servicing centers throughout the United States. For example, Ameritech's Chicago Central Monitoring Center can provide such a service. Alternatively, the system comprises a plurality of servicing centers concentrated regionally or concentrated centrally having one primary location. For example, SecurityLink™ from Ameritech may provide the monitoring service using the host processors located in various servicing centers.

It is intended that the foregoing detailed description be regarded as illustrative rather than limiting and that it is understood that the following claims, including all equivalents, are intended to define the scope of the invention.

We claim:

1. A method for minimum supervision of an offender, the offender required to report in to an electronic supervision system, the method comprising:

pre-enrolling the offender in the electronic supervision system;

assigning an authorized telephone number;

placing a telephone call by an individual from a telephone located at a remote location, the remote location telephone having an originating telephone number;

accepting the telephone call from the remote location;

determining whether the ANI of the originating telephone number is available;

capturing the ANI of the originating phone number if it is available;

entering an enrollee ID number assigned to the offender;

validating the originating telephone number against the authorized telephone number assigned to the offender to verify the remote calling location;

determining whether a voice template is on file for the offender;

if a voice template is not on file for the offender:
  receiving a telephone number from the offender;
  receiving a first voice sample from the offender;
  creating a voice template for the offender from the first voice sample received from the offender;
  placing a telephone call to the telephone number received from the offender; and
  verifying that a valid voice template has been created for the offender by receiving a second voice sample from the offender;

if a voice template is on file for the offender:
  prompting the individual to verbally respond to at least one inquiry; and
  verifying the identity of the individual placing the telephone call using voice verification technology during the telephone call;

prompting the individual for status change information;

recording a response from the individual;

notifying a supervisor of the status change information;

receiving a telephone call from the supervisor; and playing the response to the supervisor.

2. The method of claim 1 wherein the telephone call is a pre-scheduled telephone call.

3. The method of claim 1, further comprising:

creating an exception if verification step fails; and notifying a supervisor an exception is created.

4. The method of claim 2, further comprising:

authorizing a plurality of authorized telephone numbers from which the offender may place scheduled calls.

5. A method for electronically automating a reporting process of an offender under minimum supervision system that is required to place call in to a supervisor, the method comprising:

pre-enrolling the offender in the minimum supervision system;

enrolling the offender in the minimum supervision system;

authorizing at least one telephone number from which the offender may place scheduled telephone calls;

placing a scheduled telephone call from a calling party;

determining whether the Automatic Number Identification (ANI) of the telephone placing the scheduled telephone call is available;

capturing the Automatic Number Identification of the telephone placing the scheduled telephone call;

validating the Automatic Number Identification of the telephone placing the telephone call;

determining whether a voice template is on file for the offender;

if a voice template is on file for the offender:
  prompting the calling party to respond to an inquiry relating to the offender's program status; and
  verifying whether the identity of the individual placing the scheduled telephone call is the offender by using voice verification technology during the telephone call;

if a voice template is not on file for the offender:
  receiving a telephone number from the offender;
  receiving a first voice sample from the offender;
  creating a voice template for the offender from the first voice sample received from the offender;
  placing a telephone call to the telephone number received from the offender; and
  verifying that a valid voice template has been created for the offender by receiving a second voice sample from the offender;

prompting the calling party for status change information;

recording a response from the calling party;

notifying a supervisor of the status change information;

receiving a telephone call from the supervisor; and playing the response to the supervisor.

6. The method of claim 1, wherein the telephone number received from the offender comprises the authorized telephone number.

7. The method of claim 5, wherein the telephone number received from the offender comprises an authorized telephone number.

8. A method for minimum supervision of an offender, the method comprising:

creating an exception schedule specifying when and how a supervisor is to be notified of a voice verification exception, wherein the exception schedule is user definable based on an offender;

creating a status change schedule specifying when and how the supervisor is to be notified of a change in offender status, wherein the status change schedule is user definable based on an offender;

receiving a telephone call from a calling party from a telephone located at a remote location;

attempting verification of the calling party's identity using voice verification technology;

if the identity of the calling party is not verified, notifying the supervisor of a voice verification exception according to the exception schedule;

receiving status change information from the calling party; and notifying the supervisor of the status change information according to the status change schedule.

9. The method of claim 8 further comprising:

assigning a plurality of authorized telephone numbers to an offender; and verifying the remote location by validating an originating telephone number of the received telephone call against the plurality of authorized telephone numbers assigned to the offender.

10. The method of claim 8, wherein the supervisor is notified of at least one of voice verification exception and change in offender status by a notification selected from the group consisting of a page, a telephone call, a facsimile message, and an exception report.

11. The method of claim 8 further comprising prompting the calling party for status change information and recording a response from the calling party.

12. The method of claim 11 further comprising receiving a telephone call from the supervisor and playing the response to the supervisor.

13. A method of electronically monitoring the presence of an offender, the method comprising:

enrolling the offender in a computerized monitoring program, recording offender background data using a plurality of computer generated interfaces (CGI), the background data including an authorized monitoring location or locations;

generating a first computer generated telephone call to the authorized monitoring location in accordance with a verification call schedule;

determining whether the first computer generated telephone call was received at the authorized monitoring location by a receiving party;

determining whether special instructions should be played out to the receiving party after the receiving party receives the first computer generated telephone call;

playing out special instructions to the receiving party after the receiving party receives the first computer generated telephone call;

prompting the receiving party to verbally respond to at least one inquiry;

verifying that the receiving party is the offender using voice verification technology during the first generated telephone call;

determining whether a second computer generated telephone call should be generated to the authorized monitoring location if the first computer generated telephone call was not received at the authorized monitoring location by the offender or if the receiving party was not verified as the enrolled offender.

14. The method of claim 13 further comprising:

determining whether broadcasts should be played out to the receiving party after the receiving party receives the first computer generated telephone call;

playing out broadcasts to the receiving party after the receiving party receives the first computer generated telephone call.

15. The method of claim 13 further comprising the steps of generating the second computer generated telephone call to the authorized monitoring location;

generating call retry information;

maintaining a call history for the offender; and adding the generated call retry information to the call history.

16. The method of claim 13 further comprising the steps of:

generating an exception if the first computer generated telephone call was not received at the authorized monitoring location by the offender or if the receiving party was not verified as the enrolled offender;

maintaining a call history for the offender; and adding the generated exception to the call history.

17. The method of claim 16 further comprising the step of communicating the generated exception to a supervisor assigned to the offender.

18. The method of claim 13 wherein the enrollment step further comprises:

assigning the offender an enrollee identification number;

assigning the offender an enrollee risk level; and assigning the offender at least one specified authorized location.

19. A computerized method of tracking an individual traveling between a first authorized location and a second authorized location, the method comprising:

enrolling the individual in an electronic tracking program, wherein the act of enrolling comprises authorizing a predetermined travel time between the first and second locations;

using a graphical user interface (GUI) of the tracking program for recording a first authorized telephone number and a second authorized telephone number;

authorizing the individual to place a first scheduled telephone call from the first location, the first location having a first authorized telephone number;

authorizing the individual to place a second scheduled telephone call from the second location at a predetermined time after a receipt of the first scheduled telephone call, the predetermined time being determined by the predetermined travel time between the first and second locations, the second location having a second authorized telephone number;

placing a first telephone call by a first calling party into the electronic tracking system, the first telephone call placed from the first location from a first telephone having a first originating telephone number;

receiving the first telephone call;

capturing the first originating telephone number;

verifying that the first telephone call is the first scheduled telephone call;

verifying that the first originating telephone call was placed from the first authorized telephone;

using voice verification technology during the first telephone call to verify that the first calling party is the individual;

placing a second telephone call by a second calling party into the electronic tracking system, the second telephone call placed from the second location from a second telephone having a second originating telephone number;

receiving the second telephone call;

capturing the second originating telephone number;

verifying that the second telephone call is the second authorized telephone call;

verifying that the second originating telephone call was placed from the second authorized telephone; and using voice verification technology during the second telephone call to verify that the second calling party is the individual.

20. The method of claim 19 further comprising:

prompting the first calling party to respond to an inquiry;

recording a response to the inquiry.

21. The method of claim 19 wherein the enrollment step further comprises:

recording a first valid ANI for the first authorized location.

22. The method of claim 21 further comprising:

capturing a first ANI during the first telephone call;

comparing the first ANI with the first valid ANI; and generating an exception if the captured ANI is not the first valid ANI.

23. The method of claim 19 further comprising the step of:

notifying authorized personnel that the exception was generated.

24. The method of claim 19 further comprising the steps of:

assigning an enrollee identification number to the individual during enrollment;

entering the enrollee identification number during the first telephone call; and verifying the entered enrollee identification number during the first telephone call.

25. The method of claim 19 further comprising the step of tracking an amount of time between the first telephone call and the second telephone call.

26. The method of claim 19 further comprising the step of:

generating an exception if the first scheduled telephone call is not received.

27. The method of claim 19 further comprising the step of generating an exception if the first voice verification fails.

* * * * *

UNITED STATES PATENT AND TRADEMARK OFFICE
CERTIFICATE OF CORRECTION

PATENT NO. : 6,463,127 B1 Page 1 of 1
DATED : October 8, 2002
INVENTOR(S) : Edward F. Maier et al.

It is certified that error appears in the above-identified patent and that said Letters Patent is hereby corrected as shown below:

<u>Title page,</u>
Item [75], delete "Terese" and substitute -- Terry -- in its place.
Item [56], U.S. PATENT DOCUMENTS, delete "D Alessio" and substitute
-- D'Alessio -- in its place; and delete "9/1997" and substitute -- 7/1997 --
in its place.

<u>Column 20,</u>
Lines 2-3, start a new paragraph with the words "notifying a supervisor".

Signed and Sealed this

Seventeenth Day of June, 2003

JAMES E. ROGAN
*Director of the United States Patent and Trademark Office*